United States Patent [19]

Masters

[11] 4,225,960
[45] Sep. 30, 1980

[54] AUTOMATIC SYNCHRONIZING SYSTEM FOR DIGITAL ASYNCHRONOUS COMMUNICATIONS

[75] Inventor: Harvey M. Masters, Ellicott City, Md.

[73] Assignee: Westinghouse Electric Corp., Pittsburgh, Pa.

[21] Appl. No.: 16,670

[22] Filed: Mar. 1, 1979

[51] Int. Cl.² ............................................. G08C 25/02
[52] U.S. Cl. ........................................ 371/47; 371/5; 375/109; 375/114
[58] Field of Search .............. 340/146.1 D, 146.1 BA, 340/146.1 A X; 178/69.1

[56] References Cited

U.S. PATENT DOCUMENTS

| | | | |
|---|---|---|---|
| 3,733,585 | 5/1973 | Merlo | 340/146.1 D |
| 3,805,234 | 4/1974 | Masters | 340/146.1 BA |
| 3,934,224 | 1/1976 | Dulaney et al. | 340/146.1 BA |

Primary Examiner—Charles E. Atkinson
Attorney, Agent, or Firm—J. B. Hinson

[57] ABSTRACT

An asynchronous system for transmitting digital data from a data origination station to a data utilization station over a communications path such as an ordinary long-distance telephone network is disclosed. The system includes circuitry for synchronizing and maintaining synchronization between the receiving circuits and the transmitting circuits and for correcting errors introduced by the communications path. Each data word transmitted has associated therewith a synchronization code comprising a stop bit and a start bit. During normal operation, the system is synchronized by detecting the start bit which precedes the information portion of each data word. Synchronization is maintained for several data words even though the start bit is not detected due to interference, for example, by an auto-synchronization signal which includes a pulse positioned within the time period during which the start bit would normally be detected. Additionally, should a predetermined number of successive data words arrive at the receiver with errors, the auto-synchronization signal is disabled based on the assumption that the errors are due to a loss of synchronization. The transmitter circuits then transmits two synchronizing words, each containing the synchronization code with all other bits having a logic "zero" level. The synchronization code of the two synchronizing words resynchronizes the system thereby restoring normal operation. That is, the system maintains normal synchronization even though interference destroys the start and/or stop bits of a number of successive words. Should this interference continue such that the automatic synchronization circuits can no longer maintain synchronization, the auto synchronization circuit is disabled and normal synchronization is restored by transmitting two special synchronization words, all without any loss of data.

8 Claims, 8 Drawing Figures

TRANSMITTER

| FIELD CODE NO. | BIT NO. 1 | BIT NO. 2 | BIT NO. 3 | BIT NO. 4 |
|---|---|---|---|---|
| 1 | 1 | 1 | 0 | 0 |
| 2 | 0 | 1 | 0 | 1 |
| 3 | 1 | 0 | 1 | 1 |
| 4 | 0 | 0 | 1 | 0 |

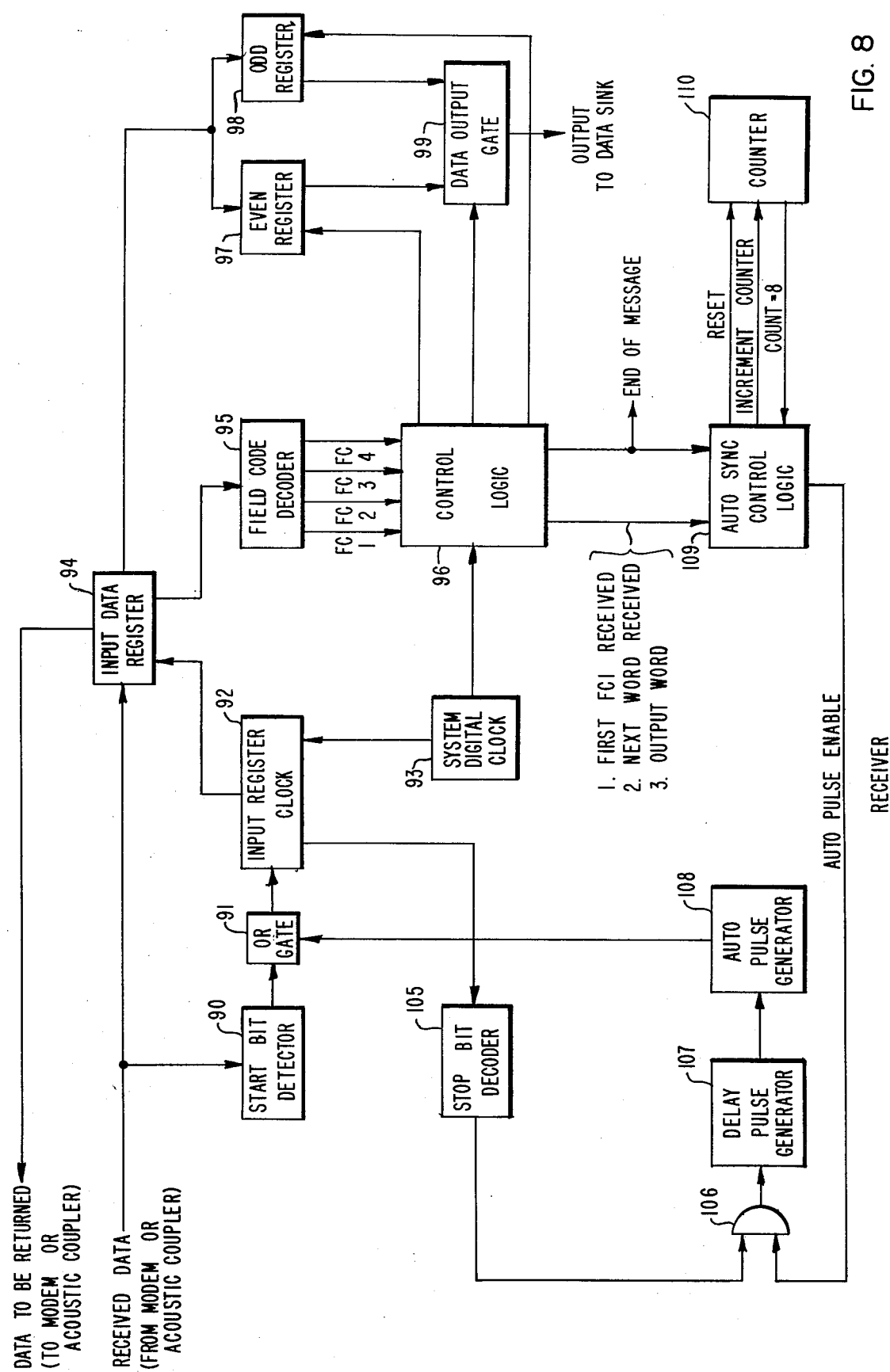

AUTOMATIC SYNCHRONIZING SYSTEM FOR DIGITAL ASYNCHRONOUS COMMUNICATIONS

BACKGROUND OF THE INVENTION

1. Field of the Invention

The invention relates to digital data transmission systems and more specifically to asynchronous digital data systems including error correction and automatic synchronization circuits for maintaining synchronization when the synchronization code is not detected for several word intervals and for resynchronizing the system where synchronization is lost.

2. Description of the Prior Art

A typical prior art system is disclosed in U.S. Pat. No. 3,805,234, assigned to the same assignee as this patent application. This prior art system includes circuitry for correcting errors, however if synchronization between the sending and receiving circuits is established and then lost due to interference in the communications path for example, synchronization is difficult to re-establish because the receiving circuits cannot recognize the difference between the synchronization code comprising start and stop bits and normal information bits within a data word. These problems are solved by the system which is the subject of this patent application. The system disclosed in this application is a modification and improvement of the system disclosed in U.S. Pat. No. 3,805,234 discussed above.

SUMMARY OF THE INVENTION

The invention comprises a data transmission system which includes a data origination station and a data utilization station which communicate via a duplex channel to transfer digital data from the data origination station to the data utilization station. Data is transferred from the data origination station to the data utilization station in the asynchronous mode. The system also includes circuitry for correcting errors introduced in the transmission channel and for maintaining synchronization between the data origination station and the data utilization station when the synchronizing code associated with each data word is destroyed in the transmission channel.

The data origination station includes (a) circuits for accepting digital data from a data source and for transmitting the digital data as a plurality of digital data words each including a synchronizing code, a field code and a data portion as a continuous output data stream; (b) small memory circuits for temporarily storing a selected number of the digital data words; (c) circuits for receiving a returned data stream from said data utilization station; (d) circuits for detecting a synchronizing code included in each data word comprising said returned data stream to generate a synchronization signal; (e) circuits for generating an automatic synchronization signal which includes a pulse substantially coincident with each pulse of the synchronizing signal; (f) circuits for combining said synchronization signal and the auto synchronization signal to generate an initiate signal; (g) circuits responsive to the initiate signal to produce a clock signal which includes a pulse positioned to shift each bit of the data words of the returned data signal into a shift register; (h) circuits for comparing the data words of the returned data stream to the counterparts of these data words as stored in the memory to generate a signal indicating which data words of the returned data stream are identical to the same words originally transmitted; (i) circuits responsive to the compare signal to generate a loss of synchronization signal when a preselected successive number of the data words comprising said returned data stream are not identical to the same words as originally transmitted; and (j) circuits responsive to said loss of synchronization signal to interrupt the output data stream and for inserting a selected number of special synchronizing words into the output data streams.

The data utilization station including (a) circuits for detecting a synchronization code associated with each data word of the received data stream to generate a pulsed synchronization signal; (b) circuit means for generating an automatic synchronizing signal which includes a pulse substantially coincident with each pulse of the synchronizing signal; (c) circuit means for combining the pulses of the synchronizing and automatic synchronizing signals to generate an initiate signal; (d) circuit means responsive to the initiate signal to shift of the data words of the received data stream into a register and for generating the returned data stream; (e) circuits responsive to the field code portion of the words of the received data stream which permit only those words received error free to be outputted and which also generate a loss of synchronization signal; (f) means responsive to the loss of synchronization signal to disable the circuitry from generating the automatic synchronizing signal and for resynchronizing the data utilization station in response to the special zero synchronizing words transmitted by said data utilization station.

BRIEF DESCRIPTION OF THE DRAWINGS

FIG. 8 is a block diagram of the receiving and transmitting circuits of the data utilization stations.

DESCRIPTION OF PREFERRED EMBODIMENT

Figure 1:
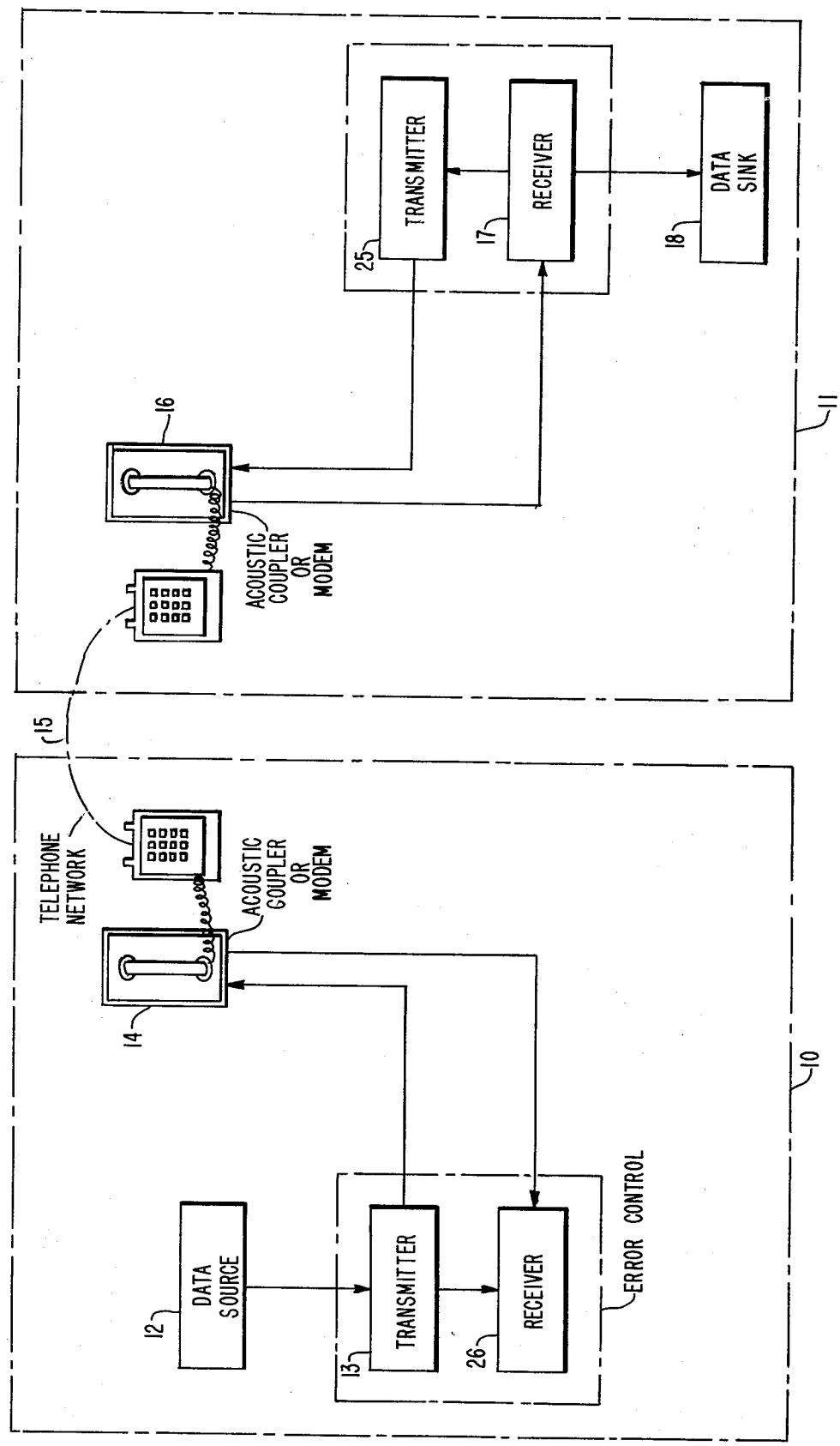
FIG. 1 is a block diagram of the system which is the subject of this invention.

FIG. 1 is a functional block diagram of the preferred embodiment of the system which is the subject of this invention. The system is a modification of the prior art system disclosed in U.S. Pat. No. 3,805,234 which is assigned to the same assignee as this application. The subject matter of U.S. Pat. No. 3,805,234 is incorporated by reference.

The modification of the system which is the subject of U.S. Pat. No. 3,805,234, consists of the addition of circuitry to maintain synchronization when interference in the transmission path, for example, results in the destruction of or the failure to detect the synchronization code of one or several consecutive words. If the interference persists and is so severe that the said additional circuitry cannot continue to maintain synchronization due to accumulated timing errors, circuitry is included also for inserting two synchronizing words in the data stream to re-establish synchronization.

The system includes a data origination (transmitting) station and a data utilization (receiving) station, 10 and 11. At the data origination station 10, digital data to be transmitted is coupled from a data source 12 to a transmitter 13. Data source 12 may be any source which generates data in a digital format. During any transmission interval a data block consisting of one or more data words may be transmitted from the data origination station 10 to the data utilization station 11.

The transmitter 13 combines a field code (the function of the field codes will be subsequently explained) and a synchronization code comprising a start bit and a stop bit with digital data from the data source 12 and couples the resulting digital data words, as a serial data stream, via an acoustic coupler 14 to a standard telephone network 15. At the data utilization station 11, the data words comprising the data stream are coupled from the telephone network 15 via a second acoustic coupler 16, to a receiver 17. The receiver 17 couples the data words as received to a data transmitter 25 which retransmits the received data words to the data utilization station 10 via acoustic coupler 16 and the telephone network 15. At the data origination station 10, the retransmitted data words are coupled via the acoustic coupler 14 to a receiver 26. Alternatively, standard modems may be used instead of the acoustic couplers 14 and 16. Thus data transmitted via the telephone network 15 consists of two simultaneous data streams which are identical except for possible errors and a time delay.

At the time a data word is originally transmitted by the data origination station 10, it is stored in a memory which is included in the transmitter 13 with storage provided for two data words. Each of the returned data words is compared to the corresponding stored data word as transmitted to detect errors. A signal indicating the detection of an error is generated if the returned data word is not identical to its stored counterpart. If an error is detected in a returned word, the two stored data words are reinserted into the transmitted data stream while data flow from the data source 12 is inhibited. This results in the correct data word, which had been returned in error, and the next subsequent data word to be retransmitted. The same two words continue to be retransmitted, if necessary, until the first one is returned without error. When the data word which was originally returned in error is correctly returned, inputting of additional data words from data source 12 is resumed. The checking and retransmitting procedure is repeated until all the data words transmitted are received at the data utilization station error-free.

Figures 2, 3:
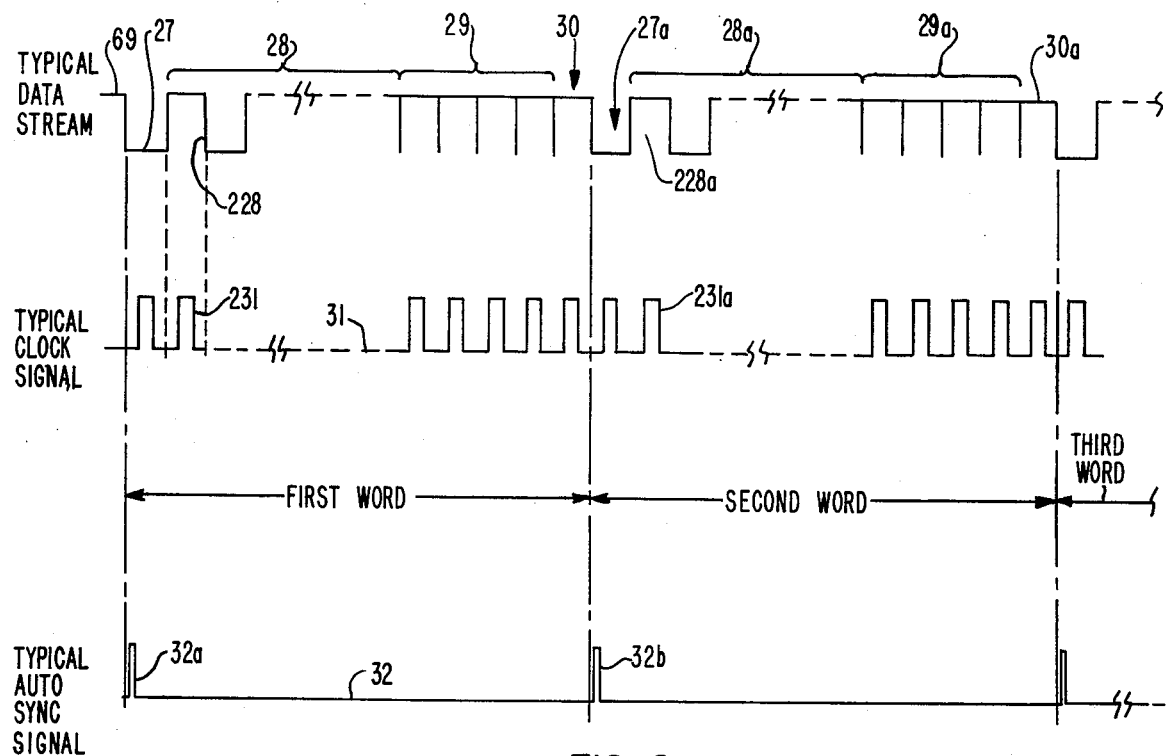
FIG. 2 is a waveform diagram illustrating the relationship between the individual data words comprising the data streams, the clock signal and the automatic synchronization signal.
FIG. 3 is a chart illustrating an example of field codes used for error detection and correction.

FIG. 2 is a diagram illustrating a typical data stream, a typical clock signal, and a typical auto-synchronization signal. The data stream, the clock signal and the auto-sync signals illustrated in FIG. 2 are "typical". By "typical" it is meant that the data stream represents the data stream from the data utilization station 10, as referenced on FIG. 1, to the data utilization station 11 as well as the data stream in the opposite direction. Similarly the clock signal is typical of the clock signal generated by both the data utilization station 11 and the data origination station 10 and used to shift the arriving data stream into a shift register. The auto-synch signal illustrated also represents the signal used by both the data origination station 10 and the data utilization station 11 to maintain synchronization when the synchronization code is not detected.

Two typical data words are illustrated in FIG. 2. The data stream transmitted in both directions via the telephone network 15 referenced in FIG. 1 consists of an indefinite number of data words having the format illustrated in FIG. 2. Each of the data words comprising the data stream includes a data portion 28 consisting of an arbitrary number of bits, a field code portion 29 illustrated as consisting of 4 bits, a start bit 27, and a stop bit 30. The start and the stop bits, 27 and 30, comprise the synchronization code previously discussed. The start and the stop bits, 27 and 30, always have opposite logic levels. In FIG. 2 the start bit 27 is indicated as having a low level (logic "zero") while the stop bit 30 has a high (logic "one") level. It should also be noted that the position of the field code portion 29 can be interchanged with the data portion 28. The second and subsequent data words are identical in structure to the first data word. By "identical" it is meant that both of the illustrated data words illustrated include a start bit, a data portion, a field code and a stop bit. In the first data word these portions are respectively identified by reference numerals 27, 28, 29 and 30, as discussed above. In the second data word these portions are respectively identified by reference numerals 27a, 28a, 29a and 30a.

At both of the data origination and data utilization stations, 10 and 11, an internal clock signal 31 is generated. Each pulse of the clock signal 31 is overlapped by a bit of the data word. At the data utilization station 11, the clock signal 31 is utilized to shift the bits of the data words comprising the arriving data stream into a shift register. At the data origination station 10, the clock signal is also used to shift the bits of the returned data stream into a shift register. The overlapping relationship between the first data bit 228 of a typical data word and the corresponding pulse 231 of the clock signal is illustrated in FIG. 2. The first data bit 228 of the data portion 28 is illustrated as having a high value (logic one). It is obvious that data bit 228 could also have a low value (logic zero).

A circuit which generates an auto-synchronization signal 32 is enabled when synchronization is established. Synchronization is indicated as being established by the data utilization system 11 outputting the first data word and the data origination station 10 detecting that the first word of the data stream has been transmitted and returned error free. The auto-synchronization signal 32 includes a pulse 32a slightly delayed from the falling edge of the start bit 27.

The function of the auto-synchronization signal 32 is to maintain synchronization when the start code 27 and/or the stop code 30 is lost due to interference in the transmission channel. Loss of either the stop or start bit can result in a failure to detect the start bit because the falling edge of the stop bit 30 is detected to establish synchronization. Loss of either of these bits will prevent this edge from being detected. The automatic synchronization signal and its function will be described in more detail later with reference to the block diagram of the system.

Each data word includes a four bit field code, as previously discussed. There are four unique field codes with these codes being cyclically assigned to the data words comprising the data stream. By cyclically assigned, it is meant that the field codes are sequentially assigned beginning with the first through the fourth code, with this one through four sequence being repeated for all subsequent new data words so long as the transmission process continues.

FIG. 3 is a chart indicating one example of a set of bit patterns representing each of the unique field codes. In the example given, the field code contains 4 bits. The bit patterns for the field codes are selected such that several bits of each code must be changed in order to generate another valid code. This prohibits a single error from changing one field code into a different code. This substantially improves the reliability of detection of these field codes. This is important because correct detection of the field codes is essential to the error correction process. If one valid field code is changed into another valid field code during transmission, the ability of the system to output error free data is disrupted. The use of the field codes in the error detection process is subsequently described in detail.

Figure 4:
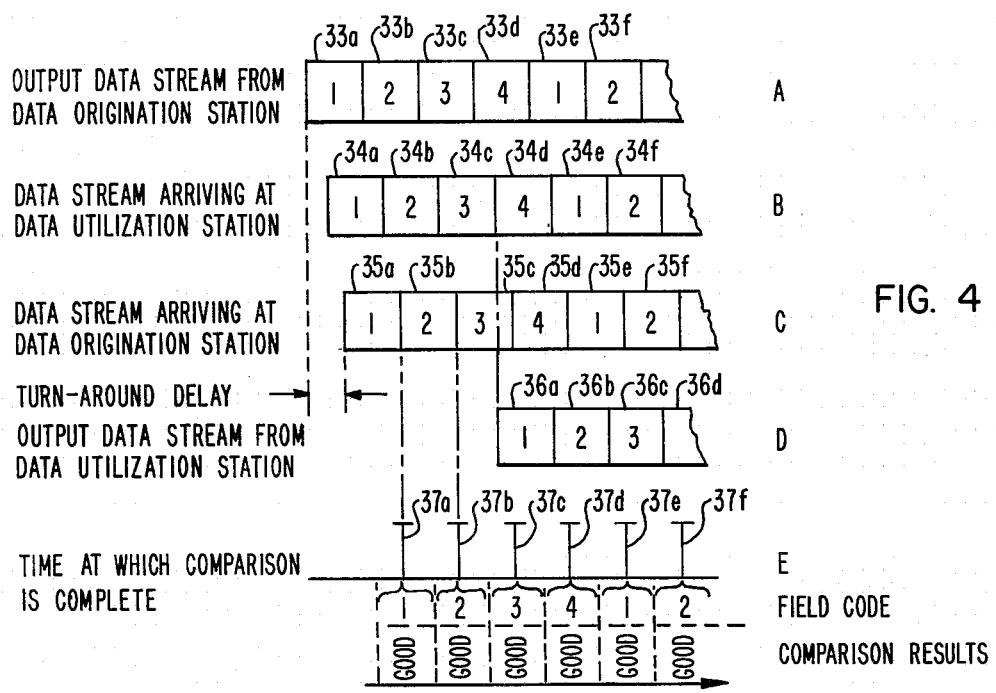
FIG. 4 is a diagram illustrating the transmission of data when no errors are detected.

FIG. 4 is a diagram illustrating the output data stream from the data origination station 10 to the data utilization station 11 in the absence of any errors being detected in the transmission process. In the top line (line A) of FIG. 4, the data words as sequentially transmitted are symbolically illustrated as rectangles and identified by reference numerals 33a-33f. The field code assigned to each of the data words is indicated by a single digit number inside each of the rectangles which symbolically represent the data words. For example, a single digit number "1" is inside the first rectangle identified by reference numeral 33a which symbolically represents the first data word transmitted. This corresponds to a field code (1100) as indicated in FIG. 3. From examining line A of FIG. 4 it can be seen that the field codes sequentially range from 1-4 and then sequentially repeated. Field codes 1 through 4 respectively represent field codes having (1100), (0101), (1011) and (0010) bit patterns as indicated in the example of FIG. 3.

Each of the data words symbolically illustrated at reference numerals 33a-33f are sequentially coupled to the telephone network 15 (FIG. 1) by the acoustic coupler 14 (FIG. 1) to produce the output data stream from the data origination station 11. This data stream is transmitted by telephone network 15 (FIG. 1) to an acoustic coupler 16 (FIG. 1) positioned at the data utilization station 11 (FIG. 1). The output signal of acoustic coupler 16 is the data stream arriving at the data utilization station 11 (FIG. 1) and illustrated in line B FIG. 4. Each word of the arriving data stream is symbolically represented by a rectangle and identified by reference numerals 34a-34f. As in line A, the field codes assigned to each of these data words are identified by a single digit number inside the rectangles representing the data words. It can be seen that the field codes arriving at the data utilization station 11 range from 1 to 4 and are then repeated.

The data stream arriving at the data utilization station 11 is coupled to the receiver 17. Each of the data words comprising the arriving data stream is also coupled via the receiver 17 to the transmitter 25 (FIG. 1), through acoustic coupler 16 (FIG. 1), and then retransmitted to the data origination station 10 (FIG. 1) through telephone network 15 (FIG. 1). At the data origination station 10 (FIG. 1), acoustic coupler 14 (FIG. 1) couples the retransmitted data words comprising the data stream arriving at the data origination station 10 to a receiver 26 (FIG. 1). The retransmitted data words arriving at receiver 26 (FIG. 1) are symbolically illustrated as rectangles and identified by reference numerals 35a-35f (line C) of FIG. 4.

As the data words were originally transmitted they were also stored in a memory comprising a portion of the transmitter 13 (FIG. 1) located at the data origination station 10 (FIG. 1). As each of the data words are returned from data utilization station 11 (FIG. 1), it is compared to the corresponding stored word to detect any errors that may have been introduced in the bidirectional transmission process. The time at which these comparisons are completed is illustrated at reference numerals 37a-37f (line E) of FIG. 4. For example, the comparison of the first word which is symbolically illustrated as a rectangle and identified by reference numeral 33a to this word as returned and similarly illustrated and identified by reference numeral 35a, is completed at a point identified by reference numeral 37a. The fact that the field code of the data word being compared to its stored counterpart is "1" is indicated by the single digit number "1" just below the point in time (identified by reference numeral 37a) at which this comparison is made. The fact that this data word was correctly transmitted is indicated by the word "good" immediately under the number "1" identifying the field code. The time at which the other words are compared and the results of these comparisons are similarly indicated at reference numerals 37b-37f. Points 37a through 37f respectively correspond to the points in time when the data words symbolically illustrated as rectangles and identified by reference number 35a through 35f in line C are respectively compared to their stored counterparts. When a particular data word has been found to be correctly transmitted, its stored counterpart is discarded.

The data words comprising the data stream arriving at the data utilization station 11 (FIG. 1) are temporarily stored with storage provided for two data words. The data words are temporarily stored until a decision can be made that they are not being retransmitted due to detected errors. The determination that a particular data word is not being retransmitted is made by examining the sequence of subsequently arriving field codes with the next two field codes being in the expected (normal) sequence indicating that the data word is not being retransmitted to correct detected errors. In the case illustrated in FIG. 4, it is assumed that no transmission errors occurred; therefore, the field codes arrive in the expected sequence. This results in the data words comprising the data stream arriving at the data utilization station 11 (FIG. 1) being outputted to generate an output data stream comprising data words symbolically illustrated as rectangles and identified by reference numerals 36a, through 36d (line D) of FIG. 4. Since this illustrates the operation when no errors are detected, the sequence of data words in line A and line D of FIG. 4 will be identical except for the time delay. If errors are detected, the sequence of the field codes of the output data stream from the data origination station 10 (line A) will be different from the sequence of field codes of the output data stream from the data utilization station 11 (line D) because all data words returned in error are retransmitted. However, the output data stream (line D) will always be identical to that from the data source, item 12, FIG. 1.

Figure 5:
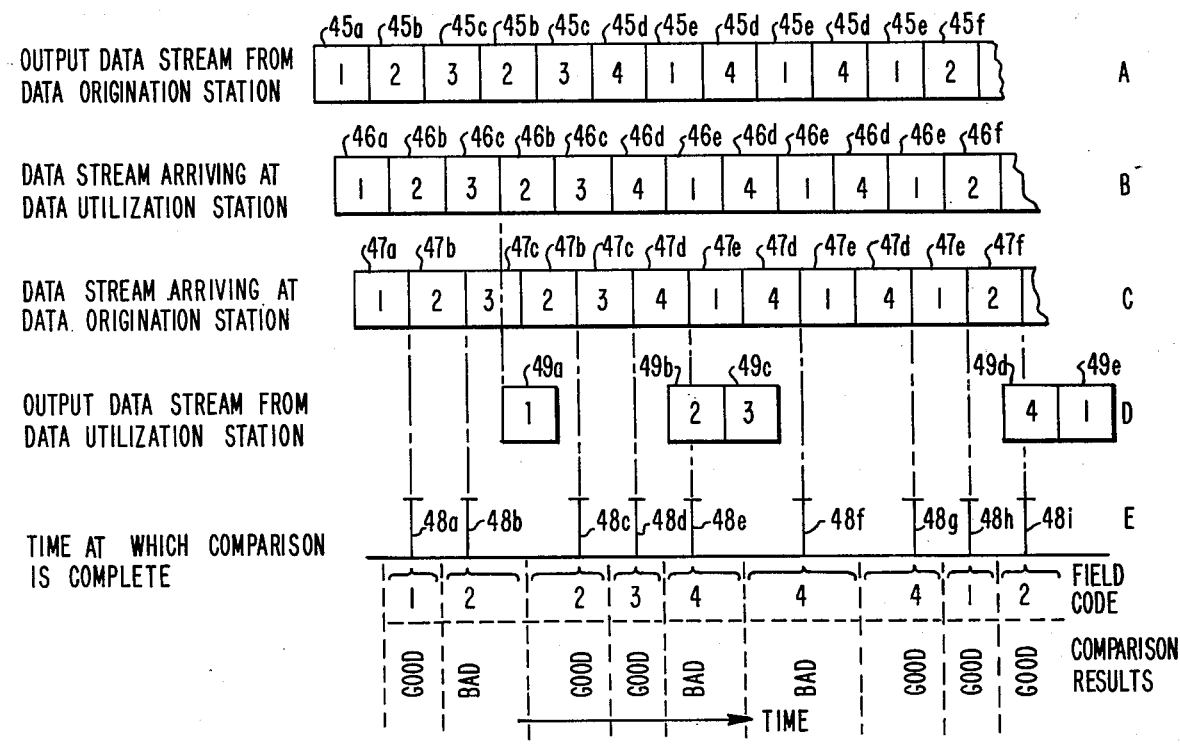
FIG. 5 is a diagram illustrating the transmission of data when errors are detected.

FIG. 5 illustrates the transmission of data when errors are detected and selected data words are retransmitted to correct the detected errors. The data words comprising the output data stream from the data origination station 10 (FIG. 1) are symbolically illustrated as rectangles in line A of FIG. 5. As previously discussed with reference to FIG. 4, the field code attached to the individual words is identified by a single digit number within the rectangles symbolically representing the data words. Similarly the data stream arriving at the data utilization station 11 (FIG. 1) are symbolically illustrated in line B with the data stream arriving at the data origination station 10 (FIG. 1) illustrated in line C.

The first data word of the output data stream of the data origination station 10 is symbolically illustrated at reference numeral 45a of line A. This word is determined to be transmitted free of errors by comparing the first word of the data stream arriving at the data origination station 11 (illustrated at reference number 47a of FIG. 5) to the counterpart of this word as stored at the time when it was originally transmitted. This comparison is completed at a point in time identified by reference numeral 48a (line E). This word is indicated as having a field code "1" by the number "1" appearing below the point identified by reference numeral 48a and as being transmitted correctly by the word "good" immediately below the number "1". Similarly the second word transmitted is symbolically illustrated by a rectangle identified by reference numeral 45b (line A). This word as returned to the data origination station 10 (FIG. 1) is compared to the corresponding stored data word at a point illustrated at reference numeral 48b (line E). This comparison results in an indication that an error was introduced in the second data word during the transmission process as indicated by the word "bad" immediately below the number "2" identifying the field code. However, it should be noted that the comparison of the second word 47b, as returned, to this word as transmitted 45b is not completed until after the third word symbolically illustrated by a rectangle and identified by reference numeral 45c (line A) is in the process of transmission. Therefore, the third data word is completely transmitted. After the transmission of the third data word is completed, inputting of data from the data source 12 is inhibited, and the second and third data words are retransmitted as indicated by these data words appearing for a second time in the output data stream (line A) from the data origination station. These words are also retransmitted from the data utilization station 11 (FIG. 1) to the data origination station 10 (FIG. 1) where the second word is again compared to the corresponding stored data word as originally transmitted. The times at which the two retransmitted words are compared to their stored counterparts are indicated at reference numerals 48c and 48d (line E). These comparisons result in indications that the second and third words were properly transmitted. These words are outputted to the data sink 18 (FIG. 1) as part of the output data stream as indicated at reference numerals 49b and 49c (line D) of FIG. 5. Following the determination that the second data word has been transmitted correctly and after the completion of the transmission of the third data word, inputting of data words from the data source 12 (FIG. 1) is resumed beginning with the data word having the field code 4 symbolically illustrated by a rectangle identified by reference numeral 45d (line A). The data word having a field code of 4 is returned to the data utilization station 10 (FIG. 1) and compared to the counterpart of this data word as transmitted at a point identified at reference numerals 48e (line E). This comparison results in an error indication. Inputting of data from data source 12 (FIG. 1) is again inhibited and the words having field codes of 4 and 1 are reinserted into the data stream as indicated by these data words appearing for a second time in the data stream (line A). Again, an error is introduced in the word having field code of 4 as indicated by the comparison completed at a point in time indicated at reference numeral 48f (line D). This results in the words having field codes of 4 and 1 being retransmitted a second time as indicated. Comparison of the data word having a field code of 4 to its stored counterpart for a third time occurs at the point identified at reference numerals 48g (line D). This comparison indicates that the data word having a field code of "4" was properly transmitted. Inputting of data words from the data source 12 (FIG. 1) is resumed following completion of the transmission of the data word having a field code of "1". The data word having a field code of "1" is compared to its stored counterpart at a time identified at reference numeral 48h. This comparison indicates that the data word having a field codes of "1" was properly transmitted. The data words having field codes of "4" and "1" are outputted as part of the output data stream as symbolically indicated by rectangles identified by reference numerals 49d and 49e (line E).

The above process illustrates how the errors are corrected. The criteria for outputting a particular data word as a part of the output data stream to the data sink 18 (FIG. 1) is that the field codes of the next two data words of the data stream arriving at the data utilization station 11 must be in the expected sequence. For example, the first data word received by the data utilization station 11 (FIG. 1), symbolically illustrated at reference numeral 46a (line B of FIG. 5), is indicated as correct by the field codes for the next two data words indicated at reference numerals 46b and 46c being in the expected 2-3 sequence. This results in the first data word being outputted to the data sink 18 (FIG. 1) as symbolically illustrated at reference numeral 49a (line D). As illustrated, the next two field codes following the second word, symbolically illustrated at 46b, are out of the expected 3-4 sequence indicating that the second and third data words, symbolically illustrated at reference numerals 45b and 45c (line A), are being retransmitted because an error has been detected in the second data word illustrated at reference numeral 45b. Since the second data word is retransmitted correctly, the next subsequent field code following "3" should be "4" as illustrated at reference numerals 46c and 46d. This results in the retransmitted word having a field code of "2" being outputted as symbolically illustrated at reference numeral 49b (line D). Similarly, the words with field codes 3, 4 and 1 are outputted as symbolically illustrated in line D FIG. 5. Due to the structure of the field codes, when a data word with field code 3 is received a stored data word with field code "1" is outputted. When word with field code 4 is received, a stored data word with field code "2" is outputted. When a data word with field code "1" is received a stored data word with field code "3" is outputted; and when data word with field code "2" is received a stored data word with field code 4 is outputted. By the same process the system also corrects for errors introduced into the field code during transmission. The comparison at the data origination station includes the field code as well as the data portion of the returned word. If the field code portion contains errors, the data word is repeated the same as if the error had been in the data portion of the word.

Figure 6:
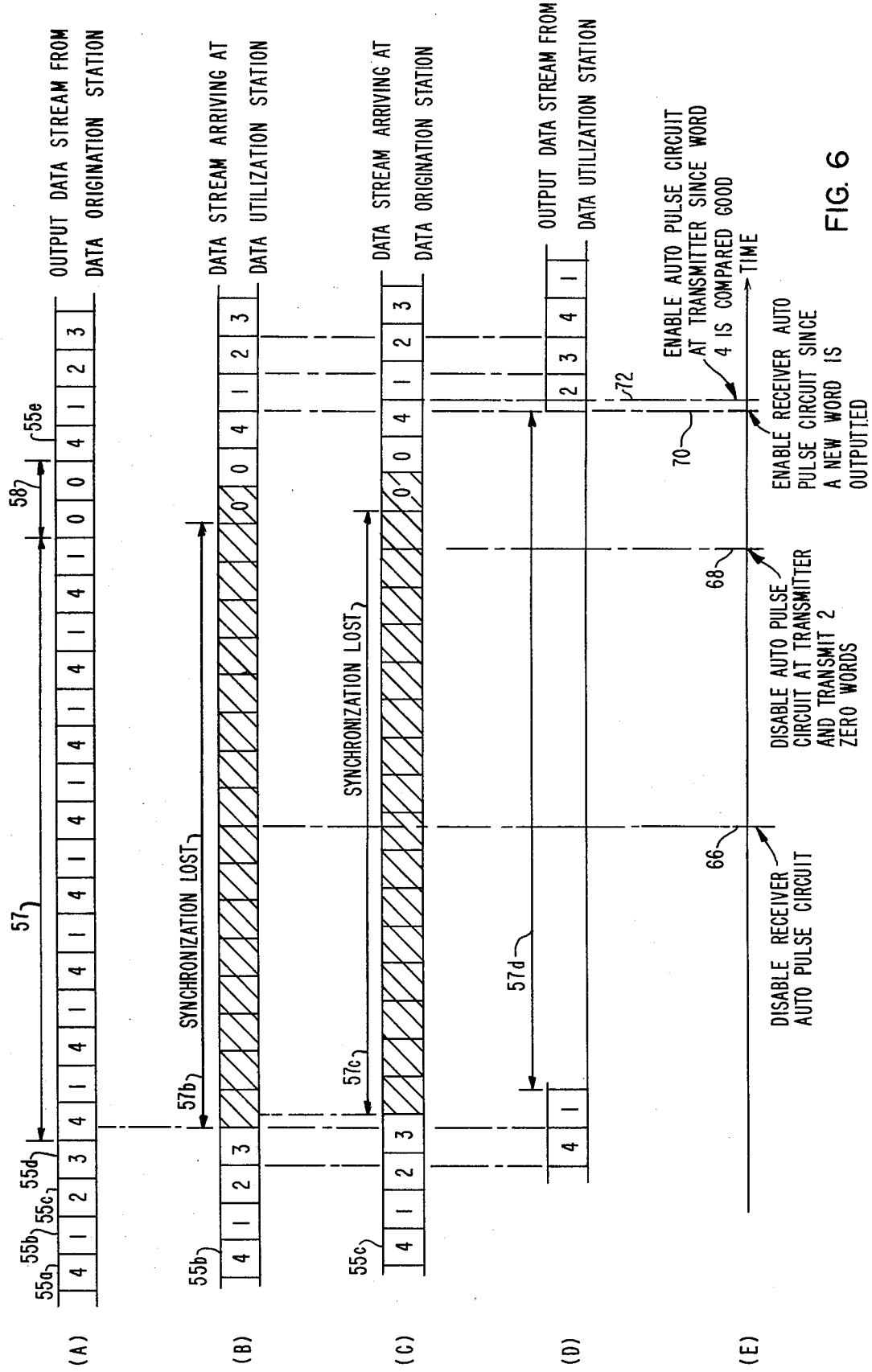
FIG. 6 is a diagram illustrating the transmission of data when synchronization is lost.

FIG. 6 is a timing chart illustrating the data streams when synchronization is lost. In FIG. 6 the one digit number inside each rectangle symbolically representing the data words identifies the field code of the data word represented thereby. Synchronization is independent of error correction except that loss of synchronization always results in introduction of errors and the loss of the field codes at the data utilization station and in the returned data. The time intervals during which the field codes are lost due to loss of synchronization are shown cross-matched in the data streams illustrated in lines B and C of FIG. 6.

At the data utilization station 11 (FIG. 1) the loss of synchronization is detected by the failure to output a data word for eight successive word intervals. At the data origination station 10, loss of synchronization is detected by a data word being transmitted eight times with each transmission resulting in an error indication. Since two data words are retransmitted each time an error is detected, loss of synchronization at the data origination station is detected in sixteen data word intervals.

Detection of loss synchronization at the data utilization station 11 (FIG. 11) disables the circuit which generates the automatic synchronization signal. At the data origination station 10 (FIG. 1), detection of loss of synchronization also disables the circuit which generates the auto-synchronization signal, interrupts the normal data sequence and inserts two synchronizing words which contain only the normal synchronization code (i.e. the start/stop bits) with all the data and field code bits having logic "zero" levels. This prohibits the data utilization station 11 from interpreting either the bits of the field code or the data portion as a start bit.

To illustrate the operation of the system when synchronization is lost, the first four data words symbolically illustrated at reference numbers 55a–55d in line A of FIG. 6 and several previous data words are assumed to have been transmitted from the data origination station 10 (FIG. 1) to the data utilization station 11 (FIG. 1) through a very noisy channel such that the start and stop bits of these and several consecutive words have been destroyed. The system, however, has maintained synchronization by the use of the auto-synchronization signal even though the synchronization code has not been detected for several word intervals. It is also assumed for purposes of illustration that the period of the severe interference has continued for an interval sufficiently long for cumulative timing errors in the automatic synchronization circuits to cause a loss of synchronization. It is also assumed that during each of the next sixteen word intervals (illustrated at reference numeral 57) no valid start bit is detected at data utilization station 11 (FIG. 1) and consequently no data words are outputted as a part of the output data stream. Detection of a valid start bit during this period will resynchronize the system; however, for purposes of illustration, it is assumed that no valid start bit is detected between the time when synchronization is lost and the transmission of the two special synchronizing words.

Since it is not possible for the data utilization station 11 (FIG. 1) to distinguish between a ZERO data bit and a legitimate start bit once synchronization is lost, the receiver circuits are designed to assume that if no data words are outputted during a continuous eight data word time interval, the cause is a loss of synchronization. Thus, the auto-synchronization circuit located at the data utilization station 11 (FIG. 1) is disabled for failure to output a data word at a point identified by reference number 66, FIG. 6.

In the illustrative example, data words comprising the output data stream of the data origination station 10 during the period 57 when loss of synchronization occurs will be two words continuously repeated as a result of errors caused by loss of synchronization. In the example, two data words having field codes of 4 and 1 are repeated. The time interval during which no data is outputted by the data utilization station 11 is illustrated at reference numeral 57d, line D.

During the time interval when synchronization is lost, an error signal will be generated at the data origination station 10 (FIG. 1) each time a returned data word is compared to its counterpart as stored at data origination station 10 (FIG. 1). Since one word following the word containing the error is always retransmitted when an error is detected, comparison of the retransmitted word in the returned data stream to its stored counterparts is delayed for two word intervals following the detection of the error as previously indicated in FIG. 5. This results in every second word of the returned data stream being compared to its stored counterpart during the interval 57c during which synchronization is lost. Each of these detected errors are counted. When eight successive errors are detected, the automatic synchronization circuit of the data origination station 10 is disabled and two data words containing all "zero" data and field code bits are inserted into the data stream. These two data words are illustrated at reference numeral 58 (line A). Following the two synchronizing words 58, normal transmission of data is resumed with the first data word transmitted having a field code of "4" as illustrated at reference numeral 55e.

The synchronizing words containing all zero data bits arrive at the data utilization station 11 (FIG. 1). Since the only logic "one" bit in either of these data words is the "stop bit", the data utilization station 11 (FIG. 1) will recognize a "start bit" and is prohibited from recognizing data or field code bits as a start bit. When the start bit is recognized, the clock signal is initialized and reception of data is resumed. When the first data word is outputted to the output data stream, the automatic synchronization signal of the data utilization station 11 is re-enabled. The point in time where the automatic synchronization circuits located at the data utilization station 11 is enabled is identified by reference numeral 70, FIG. 6. When the data origination station 10 determines that the data word 55e with a field code of "4" has been transmitted error-free, the auto synchronization circuits of the data origination station 10 are enabled and normal data transmission is resumed. The point in time at which normal data transfer is resumed is identified by reference numeral 72.

Conversely, if a "start bit" is not recognized due to continued transmission channel interference, the clock signal is not initialized and a continuous succession of errors will be detected by the data origination 10 causing the entire resynchronization process to be repeated. This cycle will continue as long as channel interference persists, periodically transmitting the two synchronizing words until synchronization is eventually reestablished. The failure to output a data word for eight consecutive word times is treated as a loss of synchronization even though synchronization may not have been lost. However, eight consecutive errors would not occur, in most cases, unless a loss of synchronization had occurred. In any event, the error correction and resynchronization process is repeated, as necessary to transmit all data words from the data source 12 (FIG. 1) correctly.

In the illustration, synchronization is assumed to be re-established on the first try as will usually be the case. Thus the output data stream is resumed, beginning with the data words having field codes of 2 and 3.

Figure 7:
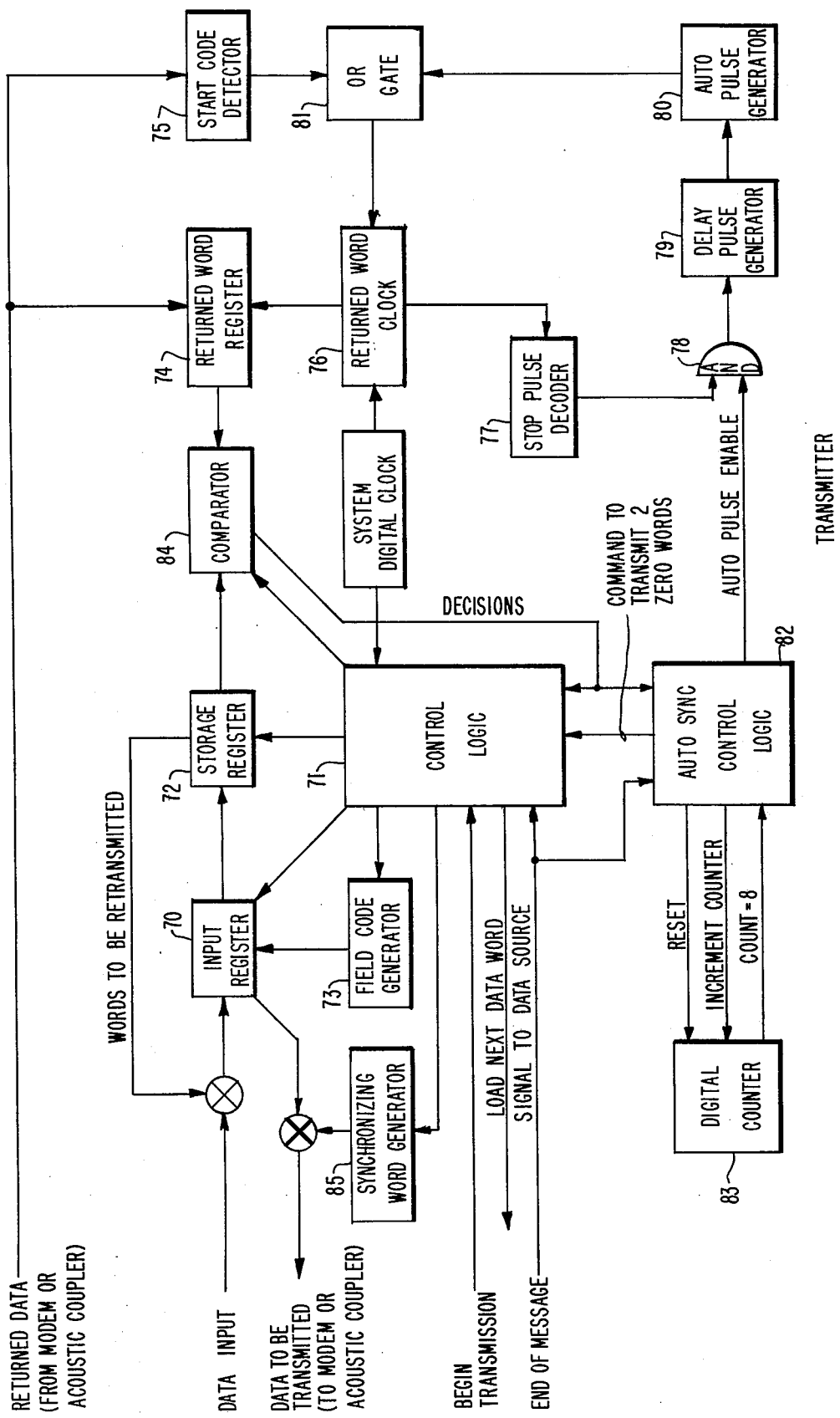
FIG. 7 is a block diagram of the transmission and receiving circuits utilized by the data origination station.

The operation of the transmitting and receiving circuits will now be explained in detail with reference to the functional block diagrams for these circuits. FIG. 7 is a block diagram of the receiver 26 and the transmitter 13 used by the data origination station 10 (FIG. 1). Similarly, FIG. 8 is a block diagram of the receiver 17 and the transmitter 25 used by the data utilization station 11 (FIG. 1).

Data to be transmitted is coupled from the data source 12 (FIG. 1) to an input register 70. A begin transmission signal indicating that transmission of data is to begin is also coupled from the data source 12 to transmitter control logic 71. The begin transmission signal initiates a load input register clock signal and causes the data from the data source 12 (FIG. 1) to be loaded into serially coupled input register 70. The load register clock signal establishes the bit intervals of the output data stream from the data origination station 10 (FIG. 1). As data is shifted into the input register 70, the data stored therein is shifted into a storage register 72. The data stored in the input register 70 is combined with a field code generated by field code generator 73 to generate data words which are coupled to the acoustic coupler 14 (FIG. 1) to be transmitted.

The return data stream from the data utilization station 11 (FIG. 1) is returned via the acoustic coupler 14 (FIG. 1) and is coupled to the input of a returned word register 74 and a start code detector 75. Start code detector 75 detects the start bit associated with each data word of the data stream and generates a start signal which initiates a return clock word generator 76 causing this circuit to generate a clock signal 31 (FIG. 2) which shifts the data words comprising the returned data stream into the return word register 74. The last pulse of the clock signal 31 generated by the return word clock generator 76, (i.e., the clock pulse associated with the stop bit) is detected by a stop pulse decoder 77 to generate a pulse which is coupled to the first input of an AND gate 78.

The data word stored in storage register 72 is compared to the data word stored in returned data word register 74 by a comparator 84 to generate a compare signal. If the data word stored in the returned data storage register 74 is not identical to the data word is storage register 72, a load next data word signal is not generated inhibiting further data transfer from the data source 12 (FIG. 1) and causes the two data words stored in the storage register 72 to be retransmitted. These two data words are continuously retransmitted until the comparator 84 indicates that the data word stored in storage register 72 has been transmitted error-free. When the comparator 84 indicates that the data word stored in the returned word register 74 is identical to the data word stored in storage register 72, the load next data word again generated permitting transfer of data to resume. When the compare signal indicates that the data word stored in the returned data register 74 is identical to the data word stored in register 72, a logic "one" compare signal is also coupled to auto-sync control logic 82. In response to the logic "one" compare signal, auto-sync control logic 82 generates an auto pulse enable signal which is coupled to one input of AND gate 78. The second input of AND gate 78 is coupled to receive the output signal of stop code decoder 77. The combination with the output signal of the stop pulse decoder 77 and the auto pulse enable signal causes the output signal of AND gate 78 to switch to a logic "one" state and initiate delay pulse generator 79. The pulse delay generator 79 generates an output pulse which is coupled to auto pulse generator 80 to generate a pulse, 32a (FIG. 3) of the auto-sync signal 32. This pulse is delayed slightly from the falling edge of the start bit. The output of the start code detector 75 and the auto-sync signal 32 are coupled through OR gate 81 to generate at the output of this gate a signal which initiates the returned word clock generator 76. The pulses of the auto-sync signal is substantially coincident with the output signal of the start code detector 75 thereby permitting the data origination station 10 (FIG. 1) to maintain synchronization of the returned data stream for several data word intervals even though start bits are not detected due to interference in either one or both transmission channels.

The auto-sync control logic 82 is also coupled to an 8-bit counter 83. Counter 83 is reset on every decision from comparator 84 indicating that the word stored in the storage register 72 is identical to the data word stored in return register 74 and incremented one count for each error detected as indicated by these data words not being identical. When the count stored in the digital counter 83 is equal to 8, indicating that 8 successive comparisons have resulted in detection of an error, loss of synchronization is assumed. A count of eight indicates that a particular word has been returned eight times incorrectly. Since each retransmission results in two data words being retransmitted, sixteen word intervals are required to accumulate a count of eight, as illustrated in FIG. 6. When a count of eight has accumulated in the digital counter 83, the auto pulse enable signal switches to a logic "zero" state thereby disabling the auto pulse generator 80. The load next data word signal is not generated preventing further transfer of data. Additionally, auto-sync control logic 82 couples a signal to the control logic 71 indicating that normal data transmission must be inhibited momentarily and that two special synchronizing words containing all zero data and field code bits must be inserted into the data stream transmitted to the data utilization system 11. This is accomplished by inhibiting the normal data output from the input register 70 and inserting two synchronizing words having all zero data and field code bits. The two synchronizing words are generated by a synchronizing word generator 85. After the two synchronizing words are inserted, the normal data transmission resumes by retransmitting the two data words stored in the storage register 72 as previously discussed with reference to FIG. 6. If the first of these data words is returned error-free, the load next data word signal will again be generated permitting additional words to be shifted into input register 70.

The two synchronizing words will be returned and shifted into the return register 74 in the normal fashion. However, these words were not shifted into the storage register 72. Therefore, comparisons will continue to occur in the normal sequence as the words are returned. The first good comparison, indicating that synchronization has been restored, will occur when the first data word following the two synchronizing words is returned error-free to the data origination station 10

(FIG. 1). This will result in counter 83 being reset and the auto pulse generator 80 being re-enabled, permitting normal operation to resume.

FIG. 8 is a functional block diagram illustrating the transmitter and the receiver circuitry of the data utilization station 11. The data from the acoustic coupler 16 (FIG. 1) is coupled to a start code detector 90. On the first falling edge of the signal from the modem 16 (FIG. 1), start code detector 90 generates a pulse indicating the beginning of the first data word. This pulse is coupled as a start signal through an OR circuit 91 to the input register clock generator 92. The input register clock generator 92 also receives a high frequency clock signal from the system digital clock 93. In response to the start signal and the high frequency clock signal the input register clock generator 92 generates a clock signal 31 (FIG. 2) which causes the input register 94 to shift in the bits of the data words comprising the data stream arriving at the data utilization station 11. The input signal to the input data register 94 is also returned to the modem 16 to be retransmitted to the data origination station 10 as the returned data stream for error control purposes as previously described.

The bits of the input data register 94 comprising the field code are coupled in parallel to a field code decoder 95. Field decoder 95 generates four signals indicating which of the four possible field codes are present in the word stored in the input data register 94. These signals are coupled to control logic 96. Additionally, the control logic 96 receives the clock signal from the system's digital clock 93. In response to the clock signals and the signals identifying the field code of the data word stored in input register 94, the control logic 96 transfers the data words stored in the input register 94 to either an even field code register 97 or an odd field code register 98, depending on whether the field code of the data word stored in input data register 94 is even or odd. The control logic 96 also examines the sequence of detected field codes. If the field codes are received in the expected sequence as previously described, indicating that the words have been received without error, a signal is coupled to the data output gate 99 to output the word stored in either the even or odd registers, depending on the portion of the sequence. If the data stored in the input data register 94 has an even field code, the data word stored in the even register 97 will be outputted and replaced by the data word in the input data register 94. Similarly, if the data word in the input data register 94 has an odd field code the data word stored in the odd data register 98 will be outputted and replaced by the word stored in input data register 94. If a valid field code is detected and there is a data word stored in the corresponding register, i.e. the even or odd register 97 or 98 having an identical field code, the data word stored in the input data register 94 is transferred to that register, 97 or 98, and no data word is outputted. The word originally stored in the even or odd register is discarded. This is the process when words are retransmitted.

The last pulse of the clock signal 31 (FIG. 2) used to shift the data words into the input register 94 (i.e., the clock pulse overlapped by the stop bit) is detected by the stop bit decoder 105. The output signal of the stop bit detector 105 is coupled through AND gate 106 to initiate a delay pulse generator 107 when gate 106 is enabled. The second input to this AND gate 106 is an autopulse enable signal from auto-sync control logic 109. When the auto pulse enable signal is a logic "one", pulse generator 107 generates a pulse which is slightly delayed from the normal pulse from the start code detector 90. This pulse is also coupled to a second input of OR gate 91 to initiate the input register clock generator 92 if the start code detector 90 does not detect the start code of the next data word. This provides a start pulse to maintain synchronization when interference in the transmission path destroys the start or stop bits of the data words received from the data origination station 10. This automatic synchronization signal is capable of maintaining synchronization for several data word times in the absence of the detection of a start bit.

Receiver logic control circuit 96 is also coupled to the auto-synchronization logic control circuit 109. The auto synchronization logic 109 is initialized by detecting the first word which arrives with a field code of one. This identifies the beginning of the message. The auto-synchronization logic 109 causes a counter 110 to be incremented one count for each word interval during which no data word is outputted from data output gate 99. Failure to output a data word indicates that it is either the beginning of the transmission or that data words are being retransmitted to correct errors. This counter is also reset each time a word is outputted from the data output gate 99 to the data sink. The auto-synchronization control logic 109 continually examines the number stored in the digital counter 110 and if this count is less than 8 an auto pulse enable signal is coupled to the second input of AND gate 106 to maintain the auto pulse generator 108 enabled. So long as the auto pulse generator 108 is enabled, synchronization can be maintained for several data word intervals in the absence of the detection of a start bit by start bit detector 90, because the pulses of the auto-sync signal from auto pulse generator 108 are substantially coincident with the output pulses of start code detector 90. When the count stored in digital counter 110 equals 8, a logic zero is coupled to the second input of AND gate 106 disabling the auto pulse generator 108. This corresponds to a continuous period of eight word intervals during which no data words are outputted, resulting in an assumption that synchronization has been lost.

Following detection of loss of synchronization at the data utilization station 11, loss of synchronization will be detected at the data origination station 10. Following detection of synchronization loss at the data origination station 10, the two synchronizing words are inserted into the output data stream from the data origination station 10. In the normal course of events when synchronization is lost, the input clock generator 92 will have completely timed out and stopped prior to the time when the second synchronizing word is received from the data origination station 10. This permits the start bit detector 90 to detect at least the start bit associated with the second synchronizing word, thus resynchronizing the system and permitting normal operation to be resumed. The digital counter 110 is reset and the auto pulse generator 108 is again enabled when the first data word following loss of synchronization is outputted from data output gate 99.

It is to be noted that priority is always given to the start bit if detected. It is only when the start bit is not detected at the proper time that the auto pulse initiates the clock signal.

The details of implementation will vary depending on the circuitry selected. However, the performance of the system is substantially independent of the logic circuits (family) used to implement the system. Since there are no preferred logic circuits for implementing the system and a skilled logic designer can easily implement the system using circuits of his choice, no detailed logic diagrams are included. The other components of the system, for example the data source 12, the acoustic couplers or modems 14 and 16, the telephone network 15 and the data sink 18 are commercially available from a wide variety of manufacturers. The functional characteristics and basic design features of these components are also well-known to those skilled in the art. Therefore, no specific examples of these components is necessary.

I claim:

1. A data transmission system including a data origination and a data utilization station and means for maintaining synchronization therebetween when detection of synchronizing codes used in synchronizing said data origination station with said data utilization station is interrupted:
    (1) said data origination station comprising;
        (a) means for selectively and sequentially accepting digital data from a data source and for transmitting said digital data as a plurality of data words each including a synchronizing code, a field code and a data portion, as a continuous output data stream,
        (b) means for temporarily storing a selected number of said data words comprising said output data stream;
        (c) means for receiving a return data stream comprising a plurality of data words from said data utilization station,
        (d) means for detecting the synchronizing code of each data word comprising said return data stream to generate a pulsed synchronizing signal;
        (e) means for generating an auto synchronization signal including a pulse substantially coincident with said synchronizing signal;
        (f) means for combining said pulsed synchronization signal with said auto synchronization signal to generate an initiate signal;
        (g) means responsive to said initiate signal to produce a multipulse clock signal which shifts the data words comprising said returned data stream into a shift register;
        (h) means for selectively comparing data words comprising said returned data stream to said stored data words to generate a compare signal;
        (i) means responsive to said compare signal to generate a loss of synchronization signal whenever a predetermined successive number of comparisons indicate that the selected word of said returned path stream is not identical to the word to which it is being compared;
        (j) means responsive to said loss of synchronization signal to interrupt said output data stream and insert therein at least one synchronization word, said synchronizing word having all bits the same value except for said synchronization code;
    (2) said data utilization station comprising;
        (a) means for detecting said synchronization code of each of said data words comprising said output data stream to generate a pulsed synchronization signal,
        (b) means for generating an auto synchronization signal including a pulse substantially coincident with said synchronizing signal,
        (c) means for combining said pulsed synchronization signal and said auto synchronization signal to generate an initiate signal,
        (d) means responsive to said initiate signal to shift a selected number of the data words comprising said output data stream into a memory and for generating said returned data stream,
        (e) means responsive to said field code of each of said data words to generate a loss of synchronization signal,
        (f) means responsive to said loss of synchronization signal to disable said means for generating an auto synchronization signal and for resynchronizing said data utilization station with said data origination station synchronizing word.

2. A data transmission system in accordance with claim 1 wherein said field codes are indicative of the original sequence in which digital data comprising said digital data words was accepted from said data source.

3. A data transmission system in accordance with claim 2 wherein said data utilization station includes means for examining the sequence of the field codes associated with the arriving data words and for determining if said field codes arrive in the expected sequence.

4. A data transmission system in accordance with claim 3 wherein said data utilization station further includes means for selectively reading data words stored in said memory and for coupling these digital data words to a data sink in response to the expected sequence of subsequently arriving field codes.

5. A data transmission system in accordance with claim 4 further including circuitry for generating a loss of synchronization signal whenever a preselected number of data words comprising said output data stream have arrived at said data utilization station without any of said digital data words having been read from said memory and coupled to said data sink.

6. A data system comprising:
    (1) a data origination station including,
        (a) means for combining a synchronizing code with digital data to be transmitted from a data origination station to a data utilization station;
        (b) means for detecting a loss of synchronization and for generating a loss of synchronization signal;
        (c) means for interrupting the transmission of data in response to said loss of synchronization signal and for transmitting at least one synchronizing word in which all bits except a synchronization code have the same logic level;
    (2) said data utilization station including,
        (a) means for detecting said synchronization code associated with each of the data words to synchronize said data utilization station with said data origination station;
        (b) means for detecting loss of synchronization and for generating a loss of synchronization signal;
        (c) means responsive to said loss of synchronization signal and to said at least one synchronizing word and in response thereto re-establishing synchronization between said data origination and data utilization stations.

7. A circuit for maintaining a receiving circuit of an asynchronous digital data system synchronized with a transmitting circuit of said system, comprising:
    (a) means for detecting a start bit preceding the data portion of each data word transmitted by said transmitting circuit to generate a pulsed synchronizing signal;
(b) timing signal generating means responsive to said pulsed synchronizing signal to generate timing signals including a clock signal having a pulse positioned in time to shift each bit of each data word transmitted by said transmitting circuit into a shift register;
(c) means for detecting the last pulse of said clock signal to generate an auto synchronization signal with the pulses of said auto synchronization signal being substantially coincident with the pulses of said pulsed synchronizing signal; and
(d) means for coupling said auto synchronization signal to said timing signal generating means such that said timing signal generating means is initiated by said auto synchronization signal when said pulsed synchronizing signal is interrupted.

8. An asynchronous digital data transmission system comprising a data origination station and a data utilization station, said data origination station including automatic synchronization circuitry comprising means for detecting loss of synchronization and means for re-establishing synchronization:
(1) said means for detecting a loss of synchronization comprising;
(a) means for comparing data words of a data stream returned from said data utilization station to data words stored at said data origination station to determine if the stored digital data word to which a word of said data stream returned from said data utilization is compared was correctly transmitted from said data origination station to said data utilization station;
(b) counter means including a digital counter which is incremented one count when a word of said data stream returned from said data utilization station is not identical to the digital word to which it is compared and for resetting said counter to zero each time a word of said data stream returned from said data utilization station is found to be identical to the data word to which it is compared;
(c) means responsive to the digital number stored in said digital counter to generate a loss of synchronization signal when said number equals a preselected value;
(2) said means for re-establishing synchronization comprising;
(a) means responsive to said loss of synchronization signal to transmit at least one synchronization word to said data utilization station,
(b) means for resuming the normal transmission of data following the transmission of said synchronizing word; and
(c) means for comparing a word of said data stream returned from said data utilization station to a word stored at said data origination station to determine if synchronization has been re-established.

* * * * *